(12) United States Patent
Choi et al.

(10) Patent No.: US 10,095,273 B2
(45) Date of Patent: Oct. 9, 2018

(54) ROLLABLE DISPLAY DEVICE AND ELECTRONIC DEVICE INCLUDING THE SAME

(71) Applicant: SAMSUNG DISPLAY CO., LTD., Yongin-si, Gyeonggi-do (KR)

(72) Inventors: Jin-Hwan Choi, Seoul (KR); Hyun-Woo Koo, Hwaseong-si (KR); Jeong-Ho Kim, Seoul (KR); Tae-Woong Kim, Seongnam-si (KR); Bo-Ik Park, Uiwang-si (KR); Tae-An Seo, Hwaseong-si (KR); Jung-Hun Lee, Hwaseong-si (KR); Hayk Khachatryan, Hwaseong-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/638,485

(22) Filed: Jun. 30, 2017

(65) Prior Publication Data

US 2018/0011517 A1 Jan. 11, 2018

(30) Foreign Application Priority Data

Jul. 5, 2016 (KR) ........................ 10-2016-0084966

(51) Int. Cl.
*G06F 1/16* (2006.01)
*G09F 9/30* (2006.01)
(52) U.S. Cl.
CPC ............ *G06F 1/1652* (2013.01); *G09F 9/301* (2013.01)
(58) Field of Classification Search
CPC .................................. G06F 1/1652; G09F 9/301
USPC ...................................................... 361/679.26
See application file for complete search history.

(56) References Cited

U.S. PATENT DOCUMENTS

| | | | |
|---|---|---|---|
| 7,710,370 | B2 | 5/2010 | Slikkerveer et al. |
| 9,158,332 | B2 * | 10/2015 | Vanska .................... G06F 1/16 |
| 9,454,181 | B2 * | 9/2016 | Breedvelt-Schouten .................... G06F 3/017 |
| 9,562,380 | B2 * | 2/2017 | Song |
| 9,772,657 | B2 * | 9/2017 | Takayanagi ........... G06F 1/1652 |
| 9,823,696 | B2 * | 11/2017 | Vanska ............... H04M 1/0202 |

(Continued)

FOREIGN PATENT DOCUMENTS

WO WO 2004/047059 A1 6/2004

OTHER PUBLICATIONS

European Search Report dated Nov. 21, 2017 in the corresponding European Patent Application No. 17179245.0.

*Primary Examiner* — Hoa C Nguyen
*Assistant Examiner* — Keith Depew
(74) *Attorney, Agent, or Firm* — Lee & Morse, P.C.

(57) ABSTRACT

A rollable display device includes a rollable structure including a plurality of unit structures, the rollable structure being rollable and unrollable based on the unit structures, and a display panel structure attached to the rollable structure, wherein respective widths of the unit structures increase in a direction from a first side of the rollable structure to a second side of the rollable structure, the first side of the rollable structure being opposite to the second side of the rollable structure, and wherein each of the unit structures includes a metal plate, the metal plate being bent by a bending limit angle in a direction in which the rollable structure is rolled, and a magnetic object on a side region of the metal plate, the magnetic object being magnetically coupled to an adjacent metal plate.

20 Claims, 8 Drawing Sheets

(56) References Cited

U.S. PATENT DOCUMENTS

| | | | | |
|---|---|---|---|---|
| 9,848,494 B2* | 12/2017 | Huitema | .................. | G06F 1/163 |
| 2008/0018631 A1* | 1/2008 | Hioki | ................ | G02F 1/133305 |
| | | | | 345/206 |
| 2010/0238612 A1* | 9/2010 | Hsiao | ................ | G02F 1/133305 |
| | | | | 361/679.01 |
| 2011/0043976 A1* | 2/2011 | Visser | ....................... | G09F 9/00 |
| | | | | 361/679.01 |
| 2011/0227822 A1* | 9/2011 | Shai | ..................... | G06F 1/1615 |
| | | | | 345/156 |
| 2013/0335929 A1* | 12/2013 | Cavallaro | ............. | G06F 1/1652 |
| | | | | 361/749 |
| 2014/0321073 A1* | 10/2014 | Hong | ................... | G06F 1/1652 |
| | | | | 361/749 |
| 2015/0325804 A1* | 11/2015 | Lindblad | ................. | H01L 51/52 |
| | | | | 313/511 |
| 2016/0320804 A1* | 11/2016 | Takayanagi | ............ | G06F 1/1615 |
| 2017/0181304 A1* | 6/2017 | Lee | ........................ | H05K 7/005 |
| 2017/0332478 A1* | 11/2017 | Choi | ..................... | H05K 1/028 |
| 2017/0359915 A1* | 12/2017 | Yang | ................... | H05K 5/0226 |

\* cited by examiner

ROLLABLE DISPLAY DEVICE AND ELECTRONIC DEVICE INCLUDING THE SAME

CROSS-REFERENCE TO RELATED APPLICATION

Korean Patent Application No. 10-2016-0084966, filed on Jul. 5, 2016, in the Korean Intellectual Property Office, and entitled: "Rollable Display Device and Electronic Device Including the Same," is incorporated by reference herein in its entirety.

BACKGROUND

1. Field

Example embodiments relate generally to an electronic device. More particularly, embodiments relate to a rollable display device that can be rolled and unrolled by a user and an electronic device including the rollable display device.

2. Description of the Related Art

Recently, consumers attribute greater importance to design of an electronic device when purchasing the electronic device. Further, consumers want an electronic device that can provide a user (e.g., a viewer) with a relatively large image while having portability. Accordingly, a rollable display device is spotlighted as a display device that is included in an electronic device.

Generally, a rollable display device is rolled to achieve a relatively small size when carried, and is unrolled to provide relatively large images to a user when used. To this end, the rollable display device includes a rollable structure and a display panel structure that is attached to the rollable structure. The display panel structure is rolled when the rollable structure is rolled by the user, while the display panel structure is unrolled when the rollable structure is unrolled by the user.

SUMMARY

According to an aspect of example embodiments, a rollable display device may include a rollable structure including a plurality of unit structures, where the rollable structure is configured to be rolled and unrolled based on the unit structures and a display panel structure attached to the rollable structure. Here, respective widths of the unit structures may increase in a direction from a first side of the rollable structure to a second side of the rollable structure, where the first side of the rollable structure is opposite to the second side of the rollable structure. In addition, each of the unit structures may include a metal plate configured to stick to magnets, where the metal plate is bent by a bending limit angle in a direction in which the rollable structure is rolled, and a magnetic object configured to cause a magnetic attraction for an adjacent metal plate, where the magnetic object is fixed on a side region of the metal plate.

In example embodiments, the magnetic object may be a permanent magnet.

In example embodiments, the magnetic object may be an electromagnet.

In example embodiments, the unit structures may collectively form first through (n)th rolling cycles, where n is an integer grater than or equal to 2, as the rollable structure is rolled, and a (k)th rolling cycle may encircle a (k−1)th rolling cycle, where k is an integer between 2 and n.

In example embodiments, an angle between adjacent ones of the unit structures may be maintained to be greater than or equal to the bending limit angle in each of the first through (n)th rolling cycles.

In example embodiments, the bending limit angle may be the same for the unit structures in each of the first through (n)th rolling cycles.

In example embodiments, the bending limit angle may differ for the unit structures in each of the first through (n)th rolling cycles.

In example embodiments, the bending limit angle applied to the (k)th rolling cycle may be the same as the bending limit angle applied to the (k−1)th rolling cycle.

In example embodiments, the bending limit angle applied to the (k)th rolling cycle may be different from the bending limit angle applied to the (k−1)th rolling cycle.

In example embodiments, the bending limit angle applied to the (k)th rolling cycle may be greater than the bending limit angle applied to the (k−1)th rolling cycle.

In example embodiments, the rollable structure may further include a dummy structure that is adjacent to the first side of the rollable structure.

In example embodiments, the rollable structure may further include a circuit structure that is adjacent to the second side of the rollable structure, and a driving integrated circuit that drives the display panel structure may be located within the circuit structure.

In example embodiments, a thickness of the circuit structure may be thinner than respective thicknesses of the unit structures.

According to an aspect of example embodiments, an electronic device may include a rollable display device, a rolling detection sensor configured to generate a rolling detection signal indicating whether the rollable display device is rolled or unrolled, and a processor configured to control a displaying operation of the rollable display device based on the rolling detection signal. The rollable display device may include a rollable structure including a plurality of unit structures, where the rollable structure is configured to be rolled and unrolled based on the unit structures, and a display panel structure attached to the rollable structure. Here, respective widths of the unit structures may increase in a direction from a first side of the rollable structure to a second side of the rollable structure, where the first side of the rollable structure is opposite to the second side of the rollable structure. In addition, each of the unit structures may include a metal plate configured to stick to magnets, where the metal plate is bent by a bending limit angle in a direction in which the rollable structure is rolled, and a magnetic object configured to cause a magnetic attraction for an adjacent metal plate, where the magnetic object is fixed on a side region of the metal plate.

In example embodiments, the unit structures may collectively form first through (n)th rolling cycles, where n is an integer grater than or equal to 2, as the rollable structure is rolled, and a (k)th rolling cycle may encircle a (k−1)th rolling cycle, where k is an integer between 2 and n.

In example embodiments, an angle between adjacent ones of the unit structures may be maintained to be greater than or equal to the bending limit angle in each of the first through (n)th rolling cycles.

In example embodiments, the bending limit angle may be the same for the unit structures in each of the first through (n)th rolling cycles.

In example embodiments, the bending limit angle may differ for the unit structures in each of the first through (n)th rolling cycles.

In example embodiments, the bending limit angle applied to the (k)th rolling cycle may be the same as the bending limit angle applied to the (k−1)th rolling cycle.

In example embodiments, the bending limit angle applied to the (k)th rolling cycle may be greater than the bending limit angle applied to the (k−1)th rolling cycle.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
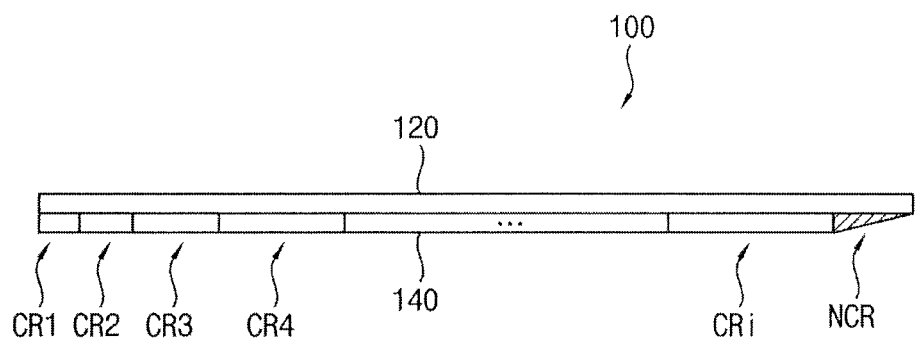
FIG. 1 illustrates a diagram of a rollable display device according to example embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments will be explained in detail with reference to the accompanying drawings.

Figure 2:
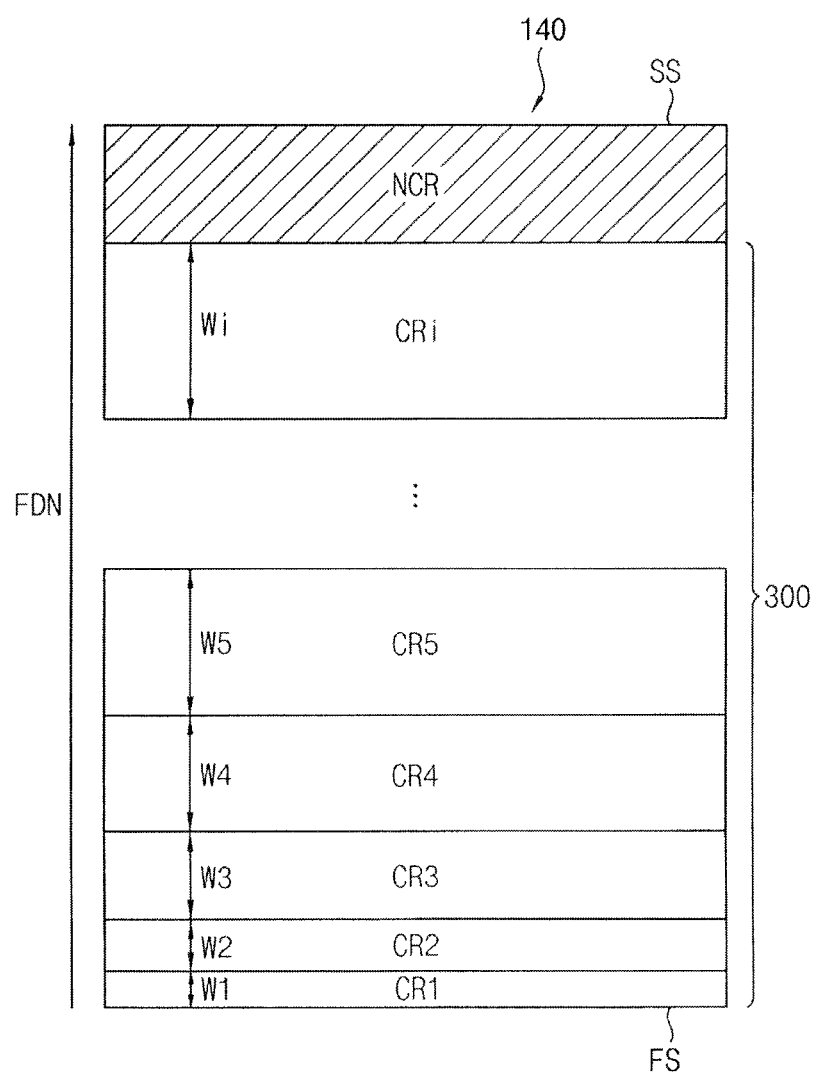
FIG. 2 illustrates a plan view of a rollable structure included in the rollable display device of FIG. 1.
Figure 3:
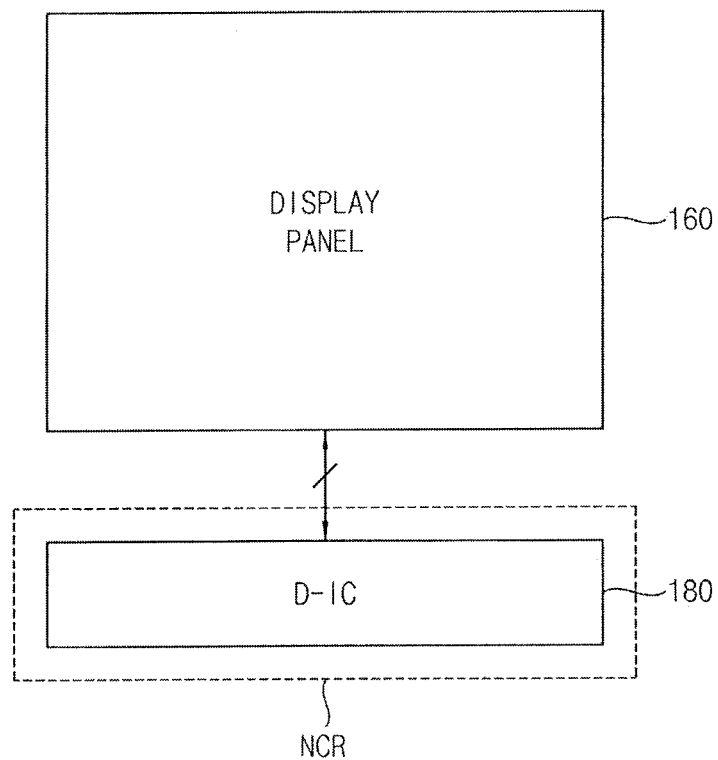
FIG. 3 illustrates a block diagram of a displaying operation of the rollable display device of FIG. 1.

FIG. 1 is a diagram illustrating a rollable display device according to example embodiments. FIG. 2 is a plan view illustrating a rollable structure included in the rollable display device of FIG. 1. FIG. 3 is a block diagram for describing a displaying operation of the rollable display device of FIG. 1.

Referring to FIGS. 1 through 3, a rollable display device 100 may include a display panel structure 120 and a rollable structure 140. In an example embodiment, the rollable display device 100 may further include a driving integrated circuit 180 that drives the display panel structure 120. As illustrated in FIG. 3, the display panel structure 120 and the rollable structure 140 may constitute a display panel 160.

In an example embodiment, as illustrated in FIG. 2, the rollable structure 140 may further include a circuit structure NCR that is adjacent to a second side SS of the rollable structure 140, and the driving integrated circuit 180 may be located in the circuit structure NCR of the rollable structure 140. In some example embodiments, the driving integrated circuit 180 may be located outside the rollable display device 100, and thus the rollable structure 140 may omit the circuit structure NCR.

In an example embodiment, the rollable structure 140 may further include a dummy structure that is adjacent to a first side FS of the rollable structure 140. The dummy structure of the rollable structure 140 may be prepared to provide a region of the rollable display device 100 that a user can grab (i.e., for user convenience) or to protect the rollable display device 100 from external shocks. Thus, the display panel structure 120 may not be located on the dummy structure of the rollable structure 140. In some example embodiments, when the rollable structure 140 does not include the circuit structure NCR, the rollable structure 140 may further include the dummy structure instead of the circuit structure NCR.

Referring to FIG. 1, the display panel structure 120 may be attached to the rollable structure 140. Here, since the display panel structure 120 is manufactured with flexible materials, the display panel structure 120 may be rolled and unrolled as the rollable structure 140 is rolled and unrolled. The display panel structure 120 may include a plurality of pixels. In an example embodiment, the pixels may include red color emission pixels, green color emission pixels, and blue color emission pixels. In another example embodiment, the pixels may include red color emission pixels, green color emission pixels, blue color emission pixels, and white color emission pixels. Thus, the display panel structure 120 may display an image using the pixels.

In an example embodiment, the rollable display device 100 may be an organic light emitting diode (OLED) display device. In this case, the display panel structure 120 may include an organic light emitting structure including organic light emitting diodes. In another example embodiment, the rollable display device 100 may be a liquid crystal display (LCD) device. In this case, the display panel structure 120 may include a liquid crystal structure including liquid crystals. However, the rollable display device 100 is not limited thereto.

Referring to FIG. 2, the rollable structure 140 may include a plurality of unit structures 300, e.g., a plurality of unit structures CR1 through CRi, and thus the rollable structure 140 may be rolled and unrolled based on the unit structures CR1 through CRi (e.g., the shape, structure, and configuration of the rollable structure 140, when rolled, may be determined by the shapes, sizes, and configurations of the unit structures CR1 through CRi). For example, the rollable structure 140 may be rolled and unrolled by bending and unbending adjacent unit structures 300, i.e., the unit structures CR1 through CRi, as will be described in more detail below with reference with FIGS. 4-7. Here, respective widths W1 through Wi of the unit structures CR1 through CRi may incrementally increase in a first direction FDN, i.e., from the first side FS of the rollable structure 140 to the second side SS of the rollable structure 140, the second side SS of the rollable structure 140 being opposite to the first side FS of the rollable structure 140.

For example, the width W2 of the second unit structure CR2 may be greater than the width W1 of the first unit structure CR1 that is closest to the first side FS of the rollable structure 140, the width W3 of the third unit structure CR3 may be greater than the width W2 of the second unit structure CR2, and the width W4 of the fourth unit structure CR4 may be greater than the width W3 of the third unit structure CR3. Thus, the display panel structure 120 may not be damaged or separated from the rollable structure 140 when the rollable structure 140 is rolled in the first direction FDN.

Figure 7:
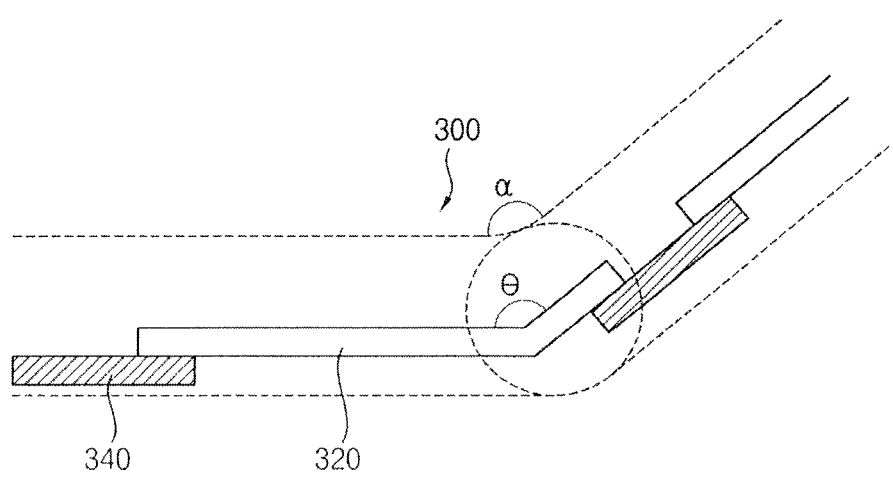

In detail, each of the unit structures CR1 through CRi may include a metal plate 320 and a magnetic object 340 (FIG. 7). The metal plate 320 may stick, e.g., attract, to magnets because the metal plate is manufactured with metal materials, e.g., the metal plate 320 may include a ferromagnetic material. The metal plate 320 may be bent by a bending limit angle in a direction in which the rollable structure 140 is rolled. The magnetic object 340 may be fixed on a side region of the metal plate 320. The magnetic object 340 may cause a magnetic attraction for an adjacent metal plate (i.e., a metal plate included in an adjacent unit structure). In an example embodiment, the magnetic object included in each of the unit structures CR1 through CRi may be a permanent magnet. In this case, the magnetic object (i.e., the permanent magnet) may maintain a magnetic force.

In another example embodiment, the magnetic object included in each of the unit structures CR1 through CRi may be an electromagnet. In this case, the magnetic object (i.e., the electromagnet) may have a magnetic force when a current flows through the magnetic object. That is, the magnetic object may lose the magnetic force when no current flows through the magnetic object. Therefore, when the magnetic object included in each of the unit structures CR1 through CRi is implemented by the electromagnet, a user may control the magnetic object to have the magnetic force when needed. For example, when the user unrolls the rollable display device 100 to use the rollable display device 100, the user may control the magnetic object not to have the magnetic force. On the other hand, when the user rolls the rollable display device 100 to carry the rollable display device 100, the user may control the magnetic object to have the magnetic force.

Figure 4:
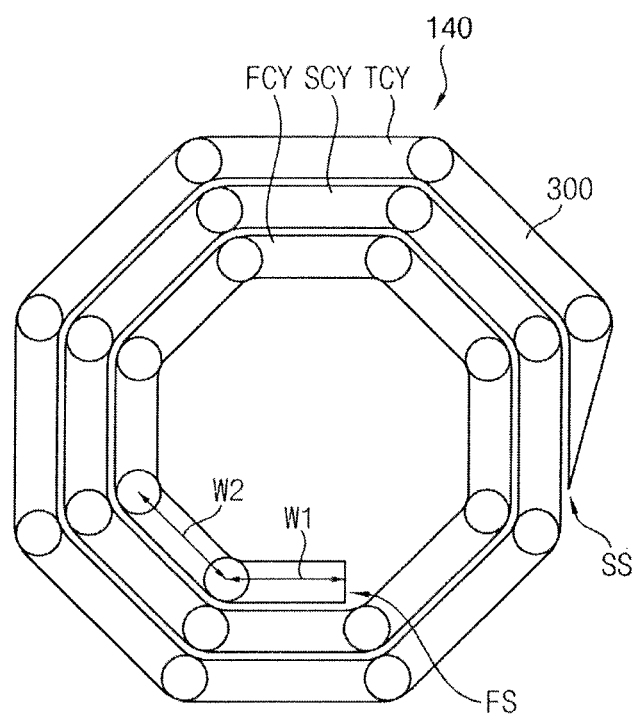
FIG. 4 illustrates a lateral view of a completely rolled exemplary rollable structure included in the rollable display device of FIG. 1.

As the rollable structure 140, to which the display panel structure 120 is attached, is rolled, the unit structures CR1 through CRi may collectively form (or, constitute) first through (n)th rolling cycles, where n is an integer greater than or equal to 2. For example, as illustrated in FIG. 4, the rollable structure 140 may be rolled to define multiple concentric rolling cycles, with the first side FS of the rollable structure 140 being inside the concentric rolling cycles, and the second side SS of the rollable structure 140 being external to the concentric cycles. Here, the (k)th rolling cycle may encircle the (k−1)th rolling cycle, where k is an integer between 2 and n.

That is, the unit structures CR1 through CRi may sequentially constitute the first through (n)th rolling cycles as the rollable structure 140, to which the display panel structure 120 is attached, is rolled. For example, the unit structures CR1 through CRi may be sequentially bent with respect to each other, e.g., at mutual boundaries thereof, to define the first through (n)th rolling cycles. For example, if the unit structures CR1 through CRi sequentially constitute first through fourth rolling cycles as the rollable structure 140, to which the display panel structure 120 is attached, is rolled in the first direction FDN, the second rolling cycle may encircle the first rolling cycle, the third rolling cycle may encircle the second rolling cycle, and the fourth rolling cycle may encircle the third rolling cycle.

According to example embodiments, in each of the first through (n)th rolling cycles, an angle between adjacent ones of the unit structures CR1 through CRi may be maintained to be greater than or equal to the bending limit angle (e.g., 145°) by a shape of the metal plate included in each of the unit structures CR1 through CRi. As a result, a stress that is applied to the display panel structure 120 and deterioration of the display panel structure 120 due to the stress may be reduced (or, minimized) because the angle between adjacent ones of the unit structures CR1 through CRi is maintained to be greater than or equal to the bending limit angle when the rollable structure 140, to which the display panel structure 120 is attached, is rolled.

Since respective widths W1 through Wi of the unit structures CR1 through CRi increase in the first direction FDN, i.e., in a direction from the first side FS of the rollable structure 140 to the second side SS of the rollable structure 140, respective widths of the metal plates included in the unit structures CR1 through CRi increase in the first direction FDN, i.e., the direction from the first side FS of the rollable structure 140 to the second side SS of the rollable structure 140, as well. In an example embodiment, the bending limit angle of the metal plate may be the same for the unit structures CR1 through CRi in each of the first through (n)th rolling cycles. In another example embodiment, the bending limit angle of the metal plate may differ for the unit structures CR1 through CRi in each of the first through (n)th rolling cycles. For example, in each of the first through (n)th rolling cycles, respective bending limit angles of the metal plates included in the unit structures CR1 through CRi may increase in the direction from the first side FS of the rollable structure 140 to the second side SS of the rollable structure 140.

As described above, the unit structures CR1 through CRi may collectively form the first through (n)th rolling cycles as the rollable structure 140, to which the display panel structure 120 is attached, is rolled, and the (k)th rolling cycle may encircle the (k−1)th rolling cycle. In an example embodiment, the bending limit angle applied to the (k)th rolling cycle may be the same as the bending limit angle applied to the (k−1)th rolling cycle. In other words, respective bending limit angles of the metal plates included in the unit structures CR1 through CRi constituting the (k)th rolling cycle may be the same as respective bending limit angles of the metal plates included in the unit structures CR1 through CRi constituting the (k−1)th rolling cycle. In another example embodiment, the bending limit angle applied to the (k)th rolling cycle may be different from the bending limit angle applied to the (k−1)th rolling cycle. That is, as the (k)th rolling cycle would collide with the (k−1)th rolling cycle, if the bending limit angle applied to the (k)th rolling cycle that encircles the (k−1)th rolling cycle were to be smaller than the bending limit angle applied to the (k−1)th rolling cycle, the bending limit angle applied to the (k)th rolling cycle is greater than the bending limit angle applied to the (k−1)th rolling cycle.

As described above, the rollable structure 140 may include the circuit structure NCR that is adjacent to the second side SS of the rollable structure 140. In this case, a chip-on flexible (COF) printed circuit board, a flexible printed circuit board (FPCB), a power connector, etc., as well as the driving integrated circuit 180, may be included in the circuit structure NCR of the rollable structure 140. In an example embodiment, as illustrated in FIG. 1, a thickness of the circuit structure NCR of the rollable structure 140 may be thinner than respective thicknesses of the unit structures CR1 through CRi of the rollable structure 140.

As illustrated in FIG. 3, the driving integrated circuit 180 may drive the display panel 160 which the display panel structure 120 and the rollable structure 140 constitute. For this operation, the driving integrated circuit 180 may include a scan driver, a data driver, a timing controller, etc. The display panel 160 may be connected to the driving integrated circuit 180 via scan-lines and data-lines. The scan driver may provide a scan signal to the display panel 160 via the scan-lines. The data driver may provide a data signal to the display panel 160 via the data-lines. The timing controller may control the scan driver, the data driver, etc. However, components included in the driving integrated circuit 180 are not limited thereto. For example, the driving integrated circuit 180 may further include a power supply that supplies power to the display panel 160.

As described previously, the rollable display device 100 may include the display panel structure 120 and the rollable structure 140. Here, the rollable display device 100 may increase respective widths W1 through Wi of the unit structures CR1 through CRi in the direction from the first side FS of the rollable structure 140 to the second side SS of the rollable structure 140. Thus, the rollable display device 100 may prevent a stress from being applied to the display panel structure 120 when the rollable structure 140 is rolled and unrolled by the user, and thus may prevent the display panel structure 120 from being damaged or separated from the rollable structure 140. That is, in the rollable display device 100, since respective widths W1 through Wi of the unit structures CR1 through CRi increase in the direction from the first side FS of the rollable structure 140 to the second side SS of the rollable structure 140, stress accumulated from an inner rolling cycle to an outer rolling cycle may be alleviated, and thus a severe stress may not be applied to the display panel structure 120.

In addition, the rollable display device 100 may include metal plates that stick to magnets and magnetic objects that cause magnetic attraction to adjacent metal plates in each of the unit structures CR1 through CRi included in the rollable structure 140, where the metal plate is bent by the bending limit angle in the direction in which the rollable structure 140 is rolled, and the magnetic object is fixed on the side region of the metal plate. Thus, the rollable display device 100 may prevent damage or deterioration of the display panel structure 120 attached to the rollable structure 140 by preventing the rollable structure 140 from being rolled (i.e., folded) by more than a specific angle when the rollable structure 140 is rolled. That is, in the rollable display device 100, since the angle between adjacent ones of the unit structures CR1 through CRi is maintained to be greater than or equal to the bending limit angle by the shape of the metal plate included in each of the unit structures CR1 through CRi, the damage or deterioration of the display panel structure 120, e.g., caused when the rollable structure 140 is rolled (i.e., folded), may be prevented, as will be described in detail below with reference to FIGS. 4-7. In example embodiments, since the magnetic force (i.e., the magnetic attraction) is caused between the magnetic object of one unit structure and the metal plate of an adjacent unit structure, when the rollable structure is completely rolled, a rolled state of the rollable structure 140 may be maintained until the user unrolls the rollable structure 140 to use the rollable display device 100.

Figure 5:
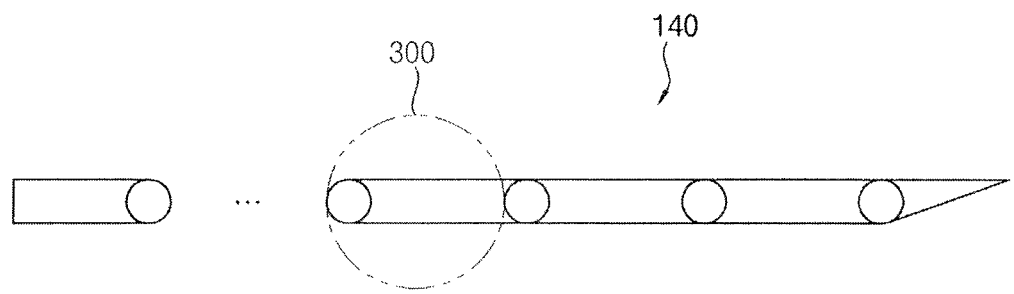
FIG. 5 illustrates a lateral view of a completely unrolled exemplary rollable structure included in the rollable display device of FIG. 1.
Figure 6:
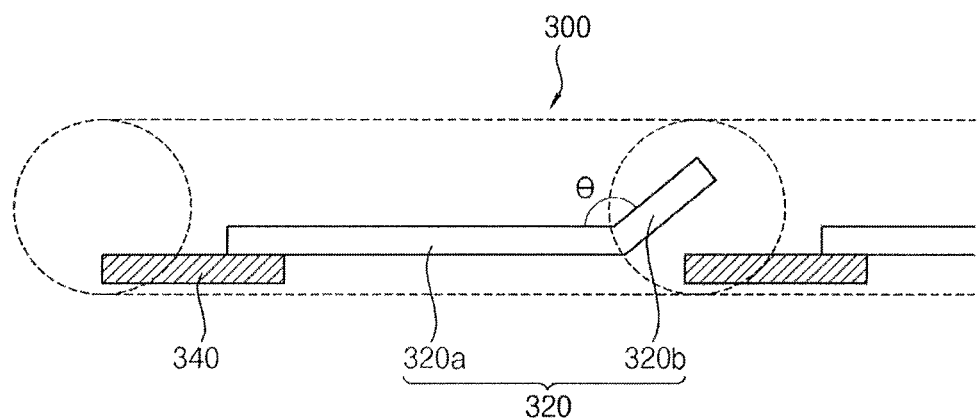
FIGS. 6 and 7 illustrate enlarged diagrams of a unit structure of a rollable structure included in the rollable display device of FIG. 1.

FIG. 4 is a lateral view illustrating an example in which the rollable structure 140 included in the rollable display device 100 is completely rolled. FIG. 5 is a schematic lateral view illustrating an example in which the rollable structure 140 included in the rollable display device 100 is completely unrolled. FIGS. 6 and 7 are diagrams illustrating enlarged schematic views of a unit structure of the rollable structure 140 in unrolled and rolled states, respectively.

Referring to FIGS. 4 through 7, the rollable structure 140 may include the unit structures 300. Thus, the rollable structure 140 may be rolled and unrolled based on the unit structures 300, e.g., by bending the unit structures 300 toward each other. Here, as illustrated in FIGS. 4 and 5, respective widths of the unit structures 300 may increase in the direction from the first side FS of the rollable structure 140 to the second side SS of the rollable structure 140, where the first side FS of the rollable structure 200 is opposite to the second side SS of the rollable structure 200. For example, the first width W1 of a first unit structure 300 immediately next to the first side FS, e.g., as measured from the edge of the first unit structure 300 at the first side FS to the first circle in FIG. 4, may be smaller than the second width W2 of a second unit structure 300 immediately adjacent to the first unit structure 300 (FIG. 4).

As discussed previously, each of the unit structures 300 may include the metal plate 320 and the magnetic object 340. For example, as illustrated in FIGS. 6-7, the metal plate 320 with the magnetic object 340 may be embedded within each unit structure 300 (each unit structure 300 is indicated by a dashed line between two dashed circles in FIGS. 6-7). The metal plate 320 may stick to magnets because the metal plate 320 is manufactured with metal materials, e.g., the metal plate 320 may be ferromagnetic. As illustrated in FIG. 6, the metal plate 320 may be bent by the bending limit angle θ in a direction in which the rollable structure 140 is rolled (e.g., an upper direction in FIGS. 5 and 6). For example, as further illustrated in FIG. 6, the metal plate 320 may include a horizontal portion 320*a* and a bent portion 320*b*, with the bent portion 320*b* being, e.g., constantly, bent toward an upper surface of the horizontal portion 320*a* at the bending limit angle θ.

As illustrated in FIG. 6, the magnetic object 340 may be fixed on a side region of the metal plate 320, e.g., the magnetic object 340 may be fixed to a lower surface of an edge of the metal plate 320. The magnetic object 340 may cause a magnetic attraction for an adjacent metal plate 320. That is, the magnetic attraction may be caused between the magnetic object 340 of a unit structure 300 and the metal plate 320 of an adjacent unit structure 300. In an example embodiment, the magnetic object 340 included in the unit structure 300 may be a permanent magnet. In this case, the magnetic object 340 may maintain a magnetic force. In another example embodiment, the magnetic object 340 included in the unit structure 300 may be an electromagnet. In this case, the magnetic object 340 may have a magnetic force when a current flows through the magnetic object 340. That is, the magnetic object 340 may lose the magnetic force when no current flows through the magnetic object 340.

As described above, the unit structures 300 may collectively form the first through (n)th rolling cycles as the rollable structure 140 is rolled, and the (k)th rolling cycle may encircle the (k−1)th rolling cycle. For example, as illustrated in FIGS. 4 and 5, the unit structures 300 may sequentially constitute the first through third rolling cycles FCY, SCY, and TCY by bending toward each other, e.g., an angle α. That is, as the rollable structure 140 is rolled, the second rolling cycle SCY may encircle the first rolling cycle FCY, and the third rolling cycle TCY may encircle the second rolling cycle SCY. Here, as illustrated in FIG. 7, the angle α between adjacent ones of the unit structures 300 may be maintained to be greater than or equal to the bending limit angle θ (e.g., 145°) by a shape of the metal plate 320, i.e., the bent portion 320b included in each of the unit structures 300. That is, a maximum angle α between adjacent ones of the unit structures 300 may be the bending limit angle θ.

As a result, damage or deterioration of the display panel structure caused when the rollable structure 140 is rolled may be minimized. Since the magnetic object 340 of the unit structure 300 causes the magnetic attraction for the metal plate 320 of an adjacent unit structure 300, the metal plate 320 of the adjacent unit structure 300 may stick to the magnetic object 340 of the unit structure 300 as the rollable structure 140 is rolled. Thus, the rollable display device 100 may be easily rolled by the magnetic force between the magnetic object 340 of the unit structure 300 and the metal plate 320 of the adjacent unit structure 300 when a user tries to roll the rollable display device 100 to carry the rollable display device 100. In addition, since the magnetic object 340 of the unit structure 300 causes the magnetic attraction for the metal plate 320 of an adjacent unit structure 300, the magnetic object 340 of the unit structure 300 may not be easily separated from the metal plate 320 of the adjacent unit structure 300 when the rollable structure 200 is completely rolled. Thus, a rolled state of the rollable structure 140 may be maintained until the user unrolls the rollable structure 140 to use the rollable display device.

Figure 8:
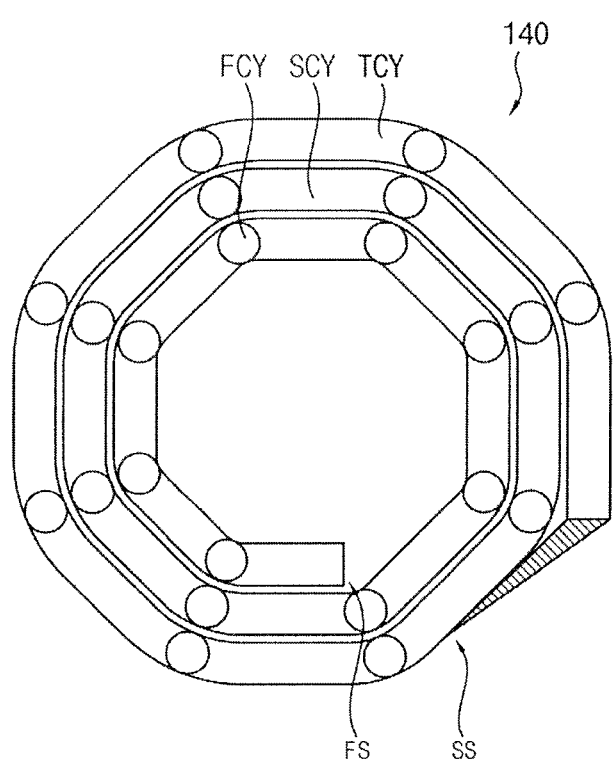
FIG. 8 illustrates a lateral view of a completely rolled exemplary rollable structure included in the rollable display device of FIG. 1.
Figure 9:
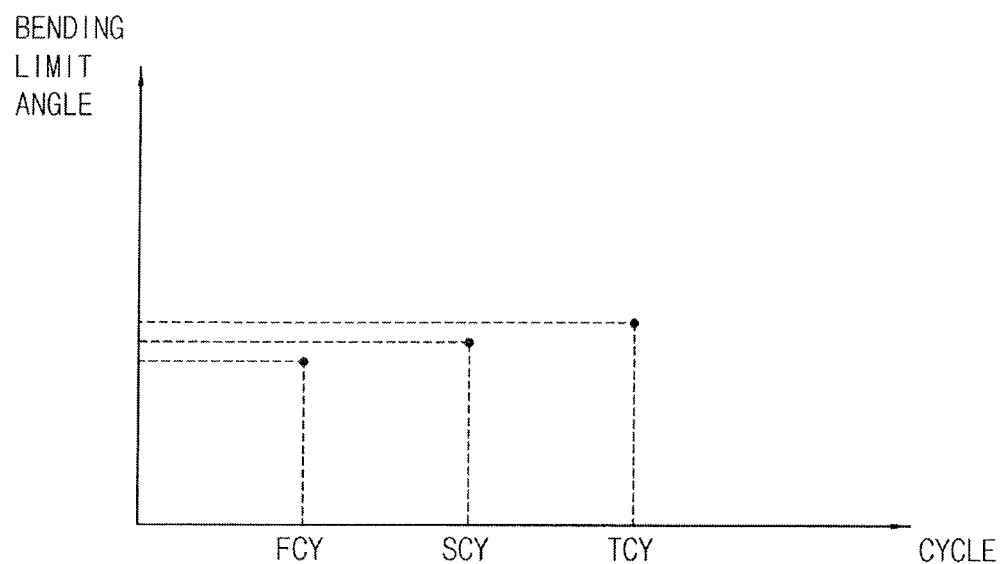
FIG. 9 illustrates a graph of an example in which bending limit angles of unit structures of a rollable structure included in the rollable display device of FIG. 1 are changed according to rolling cycles.
Figure 10:
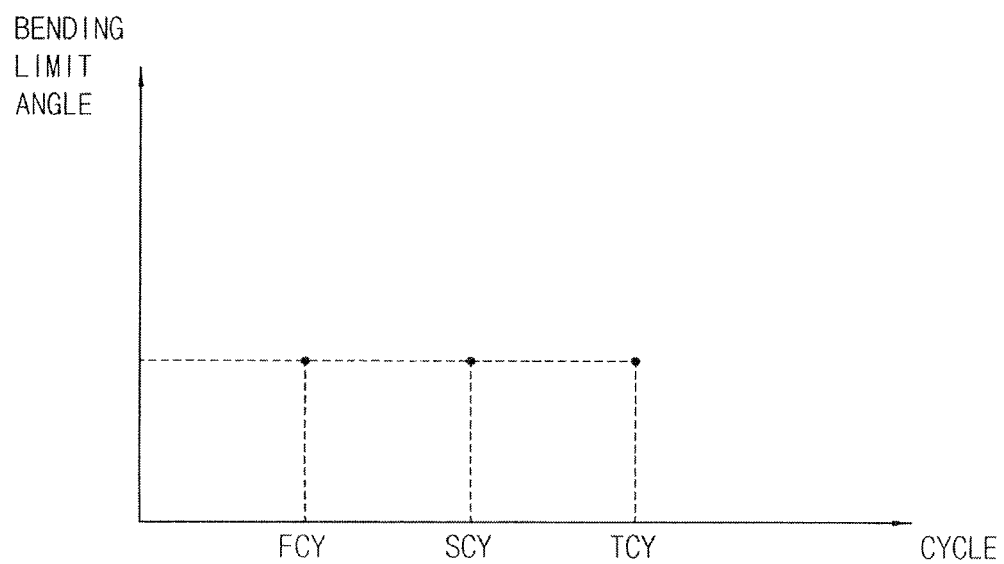
FIG. 10 illustrates a graph of an example in which bending limit angles of unit structures of a rollable structure included in the rollable display device of FIG. 1 are not changed according to rolling cycles.

FIG. 8 is a lateral view illustrating an example in which the rollable structure 140 included in the rollable display device 100 is completely rolled and includes the circuit structure NCR. FIG. 9 is a graph illustrating an example in which bending limit angles of unit structures of the rollable structure 140 included in the rollable display device 100 are changed according to rolling cycles. FIG. 10 is a graph illustrating an example in which bending limit angles of unit structures of a rollable structure included in the rollable display device 100 are not changed according to rolling cycles.

Referring to FIGS. 8 through 10, the rollable structure 140 may include a plurality of the unit structures. The rollable structure 140 may be rolled and unrolled based on the unit structures. As described above, each of the unit structures may include the metal plate and the magnetic object. The metal plate may stick to magnets because the metal plate is manufactured with metal materials. The metal plate may be bent by the bending limit angle in a direction in which the rollable structure 140 is rolled. The magnetic object may be fixed on a side region of the metal plate. The magnetic object may cause a magnetic attraction for an adjacent metal plate. In example embodiments, the magnetic object may be a permanent magnet or an electromagnet. However, the magnetic object is not limited thereto.

As illustrated in FIG. 8, respective widths of the unit structures may increase in the direction from the first side FS of the rollable structure 140 to the second side SS of the rollable structure 140. Thus, respective widths of the metal plates included in the unit structures may also increase in the direction from the first side FS of the rollable structure 140 to the second side SS of the rollable structure 140. For example, the width of the unit structure that is closest to the first side FS of the rollable structure 140 may be the smallest, and the width of the unit structure that is closest to the second side SS of the rollable structure 140 may be the greatest. Accordingly, the width of the metal plate included in the unit structure that is closest to the first side FS of the rollable structure 140 may be the smallest, and the width of the metal plate included in the unit structure that is closest to the second side SS of the rollable structure 140 may be the greatest. As the rollable structure 140 is rolled, the unit structures may sequentially constitute the first through third rolling cycles FCY, SCY, and TCY, so the second rolling cycle SCY may encircle the first rolling cycle FCY, and the third rolling cycle TCY may encircle the second rolling cycle SCY.

In an example embodiment, as illustrated in FIG. 9, the bending limit angle applied to the (k)th rolling cycle may be greater than the bending limit angle applied to the (k−1)th rolling cycle. In other words, respective bending limit angles of the metal plates included in the unit structures constituting the second rolling cycle SCY may be greater than respective bending limit angles of the metal plates included in the unit structures constituting the first rolling cycle FCY, and respective bending limit angles of the metal plates included in the unit structures constituting the third rolling cycle TCY may be greater than respective bending limit angles of the metal plates included in the unit structures constituting the second rolling cycle SCY.

In other words, the (k)th rolling cycle could have collided with the (k−1)th rolling cycle in a rolled state of the rollable structure 140, if the bending limit angle applied to the (k)th rolling cycle that encircles the (k−1)th rolling cycle were to be smaller than the bending limit angle applied to the (k−1)th rolling cycle. Therefore, the bending limit angle applied to the (k)th rolling cycle is greater than the bending limit angle applied to the (k−1)th rolling cycle. In another example embodiment, as illustrated in FIG. 10, the bending limit angle applied to the (k)th rolling cycle may be the same as the bending limit angle applied to the (k−1)th rolling cycle. In other words, respective bending limit angles of the metal plates included in the unit structures constituting the first rolling cycle FCY, respective bending limit angles of the metal plates included in the unit structures constituting the second rolling cycle SCY, and respective bending limit angles of the metal plates included in the unit structures constituting the third rolling cycle TCY may be equal to each other.

Figure 11:
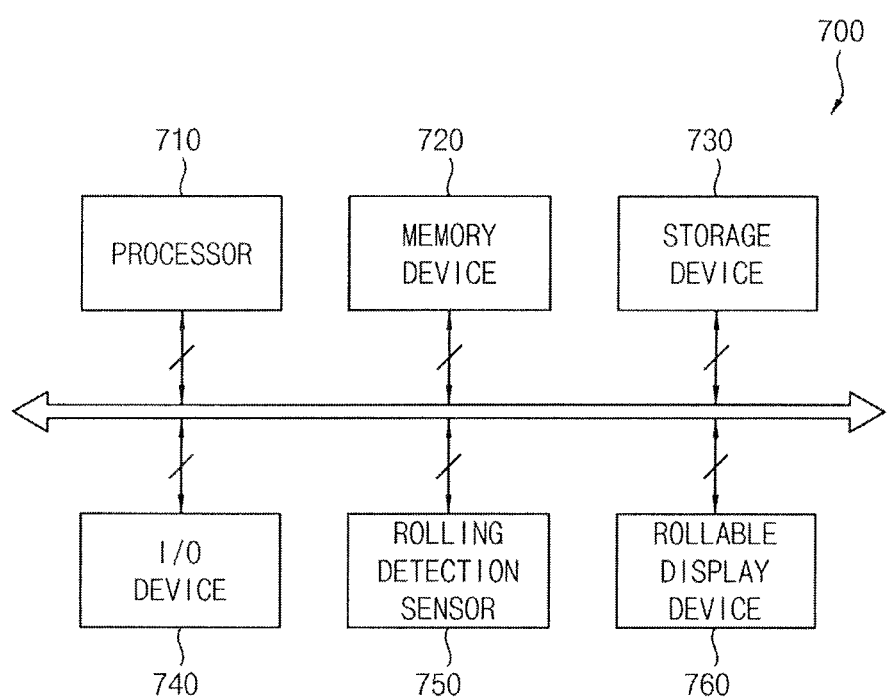
FIG. 11 illustrates a block diagram of an electronic device according to example embodiments.
Figure 12:
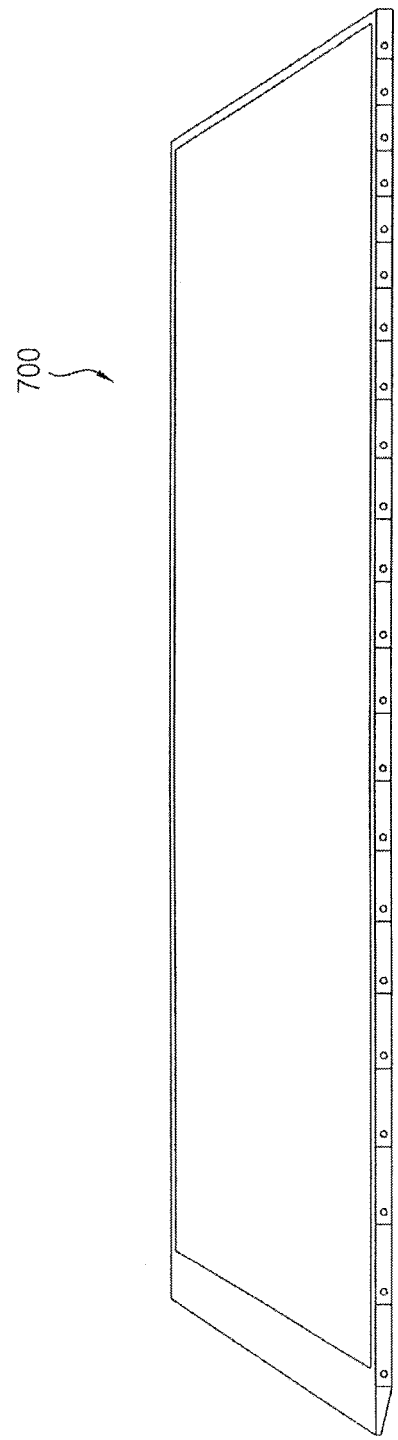
FIG. 12 illustrates a diagram of an example in which the electronic device of FIG. 11 is implemented as a smart pad.

FIG. 11 is a block diagram illustrating an electronic device according to example embodiments. FIG. 12 is a diagram illustrating an example in which the electronic device of FIG. 11 is implemented as a smart pad.

Referring to FIGS. 11 and 12, the electronic device 700 may include a processor 710, a memory device 720, a storage device 730, an input/output (I/O) device 740, a rolling detection sensor 750, and a rollable display device 760. Here, the rollable display device 760 may be the rollable display device 100 of FIG. 1. In some example embodiments, the rollable display device 760 may be implemented by an organic light emitting diode (OLED) display device, a liquid crystal display (LCD) device, etc. In addition, the electronic device 700 may further include a plurality of ports for communicating with a video card, a sound card, a memory card, a universal serial bus (USB) device, other electronic devices, etc. In an example embodiment, as illustrated in FIG. 12, the electronic device 700 may be implemented as a smart pad. However, the electronic device 700 is not limited thereto. For example, the electronic device 700 may be implemented as a cellular phone, a smart phone, a video phone, a smart pad, a smart watch, a tablet PC, a car navigation system, a television, a computer monitor, a laptop, a head mounted display (HMD) device, etc.

The processor 710 may perform various computing functions. Here, the processor 710 may control a displaying operation of the rollable display device 760 based on a rolling detection signal indicating whether the rollable display device 760 is rolled or unrolled when the rolling detection sensor 750 outputs the rolling detection signal. The processor 710 may be, e.g., a micro processor, a central processing unit (CPU), an application processor (AP), etc. The processor 710 may be coupled to other components via, e.g., an address bus, a control bus, a data bus, etc. Further, the processor 710 may be coupled to an extended bus, e.g., a peripheral component interconnection (PCI) bus.

The memory device 720 may store data for operations of the electronic device 700. For example, the memory device 720 may include at least one non-volatile memory device, e.g., an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc.

The storage device 730 may include a solid state drive (SSD) device, a hard disk drive (HDD) device, a CD-ROM device, etc. The I/O device 740 may include an input device, e.g., a keyboard, a keypad, a mouse device, a touchpad, a touch-screen, etc., and an output device, e.g., a printer, a speaker, etc. In some example embodiments, the electronic device 700 may further include a power supply that provides power for operations of the electronic device 700.

The rolling detection sensor 750 may generate the rolling detection signal indicating whether the rollable display device 760 is rolled or unrolled, and may provide the rolling detection signal to the processor 710. Thus, the rollable display device 760 may selectively perform a displaying operation suitable for a rolled state of the rollable display device 760 and a displaying operation suitable for an unrolled state of the rollable display device 760. The rollable display device 760 may be coupled to other components via the buses or other communication links. In some example embodiments, the rollable display device 760 may be included in the I/O device 740.

As described above, the rollable display device 760 may include a display panel structure and a rollable structure, to which the display panel structure is attached, and may include gradually increasing respective widths of unit structures included in the rollable structure in a direction from a first side of the rollable structure to a second side of the rollable structure that is opposite to the first side of the rollable structure, with the rollable structure being rolled or unrolled based on the unit structures. Here, the rollable display device 760 may prevent damage or deterioration of the display panel structure by preventing the rollable structure from being rolled (i.e., folded or bent) by more than a specific angle when the rollable structure is rolled. To this end, each of the unit structures of the rollable structure included in the rollable display device 760 may include a metal plate that sticks to magnets and a magnetic object that causes a magnetic attraction for an adjacent metal plate, where the metal plate is bent by a bending limit angle in a direction in which the rollable structure is rolled, and the magnetic object is fixed on a side region of the metal plate. Here, the unit structures may collectively form the first through (n)th rolling cycles when the rollable structure is rolled, the (k)th rolling cycle may encircle the (k−1)th rolling cycle, and an angle between adjacent ones of the unit structures may be maintained to be greater than or equal to the bending limit angle in each of the first through (n)th rolling cycles.

In an example embodiment, the bending limit angle may be the same for the unit structures in each of the first through (n)th rolling cycles. In another example embodiment, the bending limit angle may differ for the unit structures in each of the first through (n)th rolling cycles. In an example embodiment, the bending limit angle applied to the (k)th rolling cycle may be the same as the bending limit angle applied to the (k−1)th rolling cycle. In another example embodiment, the bending limit angle applied to the (k)th rolling cycle may be greater than the bending limit angle applied to the (k−1)th rolling cycle. Since the rollable display device 760 is described above, duplicated descriptions will not be repeated.

Example embodiments may be applied to a rollable display device and an electronic device including the rollable display device. For example, the rollable display device may include a rolltop display device, a bendable display device, a flexible display device, etc. For example, the electronic device may include a mobile device, e.g., a smart phone, a smart pad, a smart watch, a cellular phone, a video phone, a tablet PC, a car navigation system, a television, a computer monitor, a laptop, a head mounted display device, etc.

By way of summation and review, stress may be applied to a display panel structure attached to a rollable structure that is rolled or unrolled. For example, when the rollable structure is rolled (i.e., folded) by the user by more than a predetermined angle, the display panel structure attached to the rollable structure may be severely damaged.

In contrast, example embodiments provide a rollable display device capable of preventing damage or deterioration of a display panel structure attached to a rollable structure by preventing the rollable structure from being rolled (i.e., folded) by more than a specific angle when the rollable structure is rolled. Example embodiments also provide an electronic device including the rollable display device (e.g., a flexible electronic device, a rollable electronic device, etc.).

In detail, a rollable display device according to example embodiments may include a display panel structure and a rollable structure to which the display panel structure is attached, may increase respective widths of unit structures included in the rollable structure in a direction from a first side of the rollable structure to a second side of the rollable structure that is opposite to the first side of the rollable structure, and may install a metal plate that sticks to magnets and a magnetic object that causes a magnetic attraction for an adjacent metal plate in each of the unit structures included in the rollable structure, where the metal plate is bent by a bending limit angle in a direction in which the rollable structure is rolled, and the magnetic object is fixed on a side region of the metal plate. Thus, the rollable display device may prevent damage or deterioration of the display panel structure attached to the rollable structure by preventing the rollable structure from being rolled (i.e., folded) by more than a specific angle when the rollable structure is rolled.

In addition, an electronic device including the rollable display device according to example embodiments may achieve durability by preventing (or, minimizing) damage or deterioration of the display panel structure included in the rollable display device while achieving portability, usability, and good design.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rollable display device, comprising:
    a rollable structure including a plurality of unit structures, the rollable structure being rollable and unrollable based on the unit structures; and
    a display panel structure attached to the rollable structure,
    wherein respective widths of the unit structures increase in a direction from a first side of the rollable structure to a second side of the rollable structure, the first side of the rollable structure being opposite to the second side of the rollable structure, and
    wherein each of the unit structures includes:
        a metal plate having a horizontal portion and an angled portion extending from a first edge of the horizontal portion, the angled portion being bent toward an upper surface of the horizontal portion by a bending limit angle, and
        a magnetic object attached to a second edge of the horizontal portion of the metal plate, the second edge being opposite the first edge, and the magnetic object being magnetically coupled to an angled portion of an adjacent metal plate.

2. The rollable display device as claimed in claim 1, wherein the magnetic object is a permanent magnet.

3. The rollable display device as claimed in claim 1, wherein the magnetic object is an electromagnet.

4. The rollable display device as claimed in claim 1, wherein the unit structures collectively form first through (n)th rolling cycles, where n is an integer greater than or equal to 2, as the rollable structure is rolled, and a (k)th rolling cycle encircles a (k−1)th rolling cycle, where k is an integer between 2 and n.

5. The rollable display device as claimed in claim 4, wherein an angle between adjacent ones of the unit structures is maintained to be greater than or equal to the bending limit angle in each of the first through (n)th rolling cycles.

6. The rollable display device as claimed in claim 5, wherein the bending limit angle is the same for the unit structures in each of the first through (n)th rolling cycles.

7. The rollable display device as claimed in claim 5, wherein the bending limit angle differs for the unit structures in each of the first through (n)th rolling cycles.

8. The rollable display device as claimed in claim 5, wherein the bending limit angle applied to the (k)th rolling cycle is the same as the bending limit angle applied to the (k−1)th rolling cycle.

9. The rollable display device as claimed in claim 5, wherein the bending limit angle applied to the (k)th rolling cycle is different from the bending limit angle applied to the (k−1)th rolling cycle.

10. The rollable display device as claimed in claim 9, wherein the bending limit angle applied to the (k)th rolling cycle is greater than the bending limit angle applied to the (k−1)th rolling cycle.

11. The rollable display device as claimed in claim 1, wherein the rollable structure further includes a circuit structure adjacent to the second side of the rollable structure, and a driving integrated circuit within the circuit structure to drive the display panel structure, a thickness of the circuit structure being thinner than respective thicknesses of the unit structures.

12. The rollable display device as claimed in claim 1, wherein the magnetic object directly contacts the angled portion of the adjacent metal plate only upon rolling of the rollable structure, the magnetic object extending in parallel to the horizontal portion along a lower surface of the horizontal portion.

13. The rollable display device as claimed in claim 12, wherein:
    the angled and horizontal portions of the metal plate are flat and linear portions that are integral with each other to define one seamless metal plate, the horizontal portion being longer than the angled portion, and
    the bending limit angle between the angled and horizontal portions is a constant angle, the bending limit angle being between upper, external surfaces of the angled and horizontal portions.

14. An electronic device, comprising:
    a rollable display device including:
        a rollable structure including a plurality of unit structures, the rollable structure being rollable and unrollable based on the unit structures, and
        a display panel structure attached to the rollable structure,
    a rolling detection sensor to generate a rolling detection signal indicating whether the rollable display device is rolled or unrolled; and
    a processor to control a displaying operation of the rollable display device based on the rolling detection signal,
    wherein respective widths of the unit structures increase in a direction from a first side of the rollable structure to a second side of the rollable structure, the first side of the rollable structure being opposite to the second side of the rollable structure, and
    wherein each of the unit structures includes:
        a metal plate having a horizontal portion and an angled portion extending from a first edge of the horizontal portion, the angled portion being bent toward an upper surface of the horizontal portion by a bending limit angle, and
        a magnetic object attached to a second edge of the horizontal portion of the metal plate, the magnetic object being magnetically coupled to an angled portion of an adjacent metal plate.

15. The electronic device as claimed in claim 14, wherein the unit structures collectively form first through (n)th rolling cycles, where n is an integer greater than or equal to 2, as the rollable structure is rolled, and a (k)th rolling cycle encircles a (k−1)th rolling cycle, where k is an integer between 2 and n.

16. The electronic device as claimed in claim 15, wherein an angle between adjacent ones of the unit structures is maintained to be greater than or equal to the bending limit angle in each of the first through (n)th rolling cycles.

17. The electronic device as claimed in claim 16, wherein the bending limit angle is the same for the unit structures in each of the first through (n)th rolling cycles.

18. The electronic device as claimed in claim 16, wherein the bending limit angle differs for the unit structures in each of the first through (n)th rolling cycles.

19. The electronic device as claimed in claim 16, wherein the bending limit angle applied to the (k)th rolling cycle is the same as the bending limit angle applied to the (k−1)th rolling cycle.

20. The electronic device as claimed in claim 16, wherein the bending limit angle applied to the (k)th rolling cycle is greater than the bending limit angle applied to the (k−1)th rolling cycle.

* * * * *